United States Patent Office 2,709,669
Patented May 31, 1955

2,709,669

PROCESS FOR SEPARATING VITAMIN $B_{12}$ ACTIVE SUBSTANCES FROM CONTAMINANTS

Henry M. Shafer, Westfield, N. J., and Arnold J. Holland, Penn Laird, Va., assignors to Merck & Co., Inc., Rahway, N. J., a corporation of New Jersey No Drawing. Application June 13, 1951,
Serial No. 231,448

11 Claims. (Cl. 167—81)

This invention relates to the treatment of concentrates containing vitamin $B_{12}$ active substances to remove contaminants therefrom and effect a substantially quantitative recovery of the active substances as vitamin $B_{12}$. More particularly, the invention relates to procedures for employing anion exchangers in the treatment of concentrates containing vitamin $B_{12}$ active substances to effect both a separation of contaminants from the vitamin $B_{12}$ active substances and a recovery of said active substances as vitamin $B_{12}$.

A number of procedures have been disclosed for recovering concentrates containing vitamin $B_{12}$ active substances from liver and from fermentation products obtained by the propagation in suitable nutrient media of vitamin $B_{12}$ producing organisms. For example, the preparation of such concentrates from anahaemin, a commercial liver extract, is disclosed in the Journal of Pharmaceutical Pharmacology, 1, 60 (1949), while procedures for obtaining concentrates of vitamin $B_{12}$ active substances from *S. Aureofaciens* and *S. griseus* fermentation products are disclosed in the Proceedings of the Society of Experimental Biology and Medicine, 72, 643 (1949) and in U. S. Patent No. 2,530,416. The latter procedures are equally effective in preparing concentrates of vitamin $B_{12}$ active substances from fermentation products obtained in the propagation of *Mycobacterium smegmatis, Pseudomonas lumichroma, Alternaria alevaeca, Bacillus megatherium, Alkaligenes faecalis, Streptomyces fradiae*, and other vitamin $B_{12}$ producing organisms.

By the term vitamin $B_{12}$ active substances as used herein is meant vitamin $B_{12}$ itself, a compound now recognized to be a cobalt complex containing a characteristic CN group, and closely related cobalt complexes, which may be referred to as vitamin $B_{12}$ analogs, and which differ from vitamin $B_{12}$ in having some other characteristic group or anion in place of the CN group. Concentrates of vitamin $B_{12}$ active substances derived from liver and from fermentation products generally contain one or more of the related complexes or analogs in addition to vitamin $B_{12}$ itself, and it is also possible by chemical reaction to convert vitamin $B_{12}$ to related complexes or analogs. By way of illustration, it has been shown that vitamin $B_{12a}$, the hydroxy analog of vitamin $B_{12}$, can be prepared by hydrogenation of vitamin $B_{12}$ as disclosed in the Journal of the American Chemical Society, 71, 1514, and as further described in the Journal of the American Chemical Society, 73, 335–7 (1951), and Science 112, 354–5 (1950).

Procedures heretofore available for recovering vitamin $B_{12}$ from concentrates containing vitamin $B_{12}$ active substances are complicated and circuitous, generally involving repeated extractions with different solvents, concentration of extracts, countercurrent distribution between different solvents such as water and benzyl alcohol, and repeated precipitation of active substances from solution by means of solvents such as acetone, which are essentially non-solvents for vitamin $B_{12}$, before a sufficiently purified product is obtained to permit the recovery of crystalline vitamin $B_{12}$. In these procedures the problems are multiplied by the presence of vitamin $B_{12}$ analogs due to the solubility characteristics of vitamin $B_{12}$ and its various analogs. It is possible to materially simplify the recovery procedures by treating a concentrate containing vitamin $B_{12}$ active substances with a substance furnishing cyanide ion as disclosed in U. S. Patent No. 2,530,416, to thereby convert substantially all of the active substances to vitamin $B_{12}$. Even when the concentrate contains substantially all the vitamin $B_{12}$ activity in the form of vitamin $B_{12}$, however, the large amount and complex nature of contaminants present in the concentrate render the recovery procedures circuitous and inefficient.

We have now discovered that it is possible to greatly shorten and simplify the recovery of vitamin $B_{12}$ from concentrates containing vitamin $B_{12}$ active substances by new procedures involving treatment of solutions of such concentrates with anion exchangers. The active substances, i. e., vitamin $B_{12}$ and/or analogs of vitamin $B_{12}$, which may be present in the concentrate are not normally adsorbed to any appreciable extent by means of anion exchangers, although we have found that a portion of the impurities or contaminants generally ranging from about 5 to 20% of the total solids may be adsorbed. Surprisingly, however, we have discovered that when a source of cyanide ion is present, as the solution of active substances is contacted with an anion exchanger, there is a substantial, and often almost quantitative adsorption of active material. We have further found that the active substances thus adsorbed can be recovered by washing or eluting the anion exchanger with an acidic eluting agent and that the active substances are present in the resulting eluate primarily in the form of vitamin $B_{12}$ itself.

While the exact mechanism of this adsorption is not known, it appears that in the presence of cyanide an anion exchanger-cyanide-vitamin $B_{12}$ complex is formed. It further appears that anion exchanger-cyanide-vitamin $B_{12}$ analog complexes may be formed at times. At the same time, however, the cyanide acts to convert analogs of vitamin $B_{12}$ which may be present to vitamin $B_{12}$ with the result that most of the active substances are adsorbed as vitamin $B_{12}$.

The degree of adsorption depends upon a number of factors including the characteristics of the anion exchanger, the nature of the contaminants present in the solution, and the manner of introducing cyanide ion to the system. These points will be more fully hereinafter discussed, but concerning the manner of introducing cyanide to the system, it should be noted that cyanide can be introduced either by pretreatment of the anion exchanger with an ionizable cyanide, addition of ionizable cyanide to the solution of active substances before contacting with the anion exchanger or by a combination of these procedures.

In the adsorption step, the major portion of the contaminants present in the starting solution are removed in the effluent, but certain contaminants, i. e., those adsorbed by an anion exchange resin, can also be adsorbed when cyanide is present, and to the extent that such contaminants are adsorbed, the capacity of the resin for adsorption of vitamin $B_{12}$ may be reduced. We prefer, therefore, to subject the solution of active substances, prior to addition of cyanide, to a preliminary treatment with an anion exchanger to adsorb from solution the contaminants which can interfere with the adsorption of vitamin $B_{12}$.

The contacting of a solution of viatmin $B_{12}$ active substances with an anion exchanger in the absence of cyanide ion as above described is independently useful as a means for removing contaminants, and particularly colored impurities, from solutions of vitamin $B_{12}$ active substances. In particular, we have found that final stages in the preparation of vitamin $B_{12}$ crystals can be simplified by treating a solution prepared from crude crystalline material with an anion exchanger to remove troublesome contaminants and colored impurities.

Regarded in certain of its broader aspects, our invention resides in new procedures for the purification of vitamin $B_{12}$ which comprise contacting a solution of vitamin $B_{12}$ active substances and contaminants with an anion exchanger and separating the resulting adsorbate from residual solution, thereby effecting in the absence of cyanide ion a partial removal of contaminants in the adsorbate, and in the presence of cyanide ion a removal of vitamin $B_{12}$ active substances in the adsorbate.

In carrying out our new purification procedures, we can start with concentrates containing vitamin $B_{12}$ active substances derived from various sources such as liver, fermentation products, or mother liquors, wash waters and other by-products in vitamin $B_{12}$ recovery procedures. The procedures can advantageously be employed with starting concentrates of relatively high vitamin $B_{12}$ content such, for example, as concentrates containing 25–50% or more of the total solids as vitamin $B_{12}$ active substances. The commercial advantages of the procedures, however, are more fully realized when starting concentrates are employed in which vitamin $B_{12}$ active substances account for less than about 5% of the total solids. By way of illustration, very satisfactory results are obtained with starting concentrates derived from fermentation products in which vitamin $B_{12}$ active substances comprise about 0.5–1.5% of the total solids. Concentrates of much lower potency can, of course, be employed, as for example, concentrates containing as little as 0.05–0.1% vitamin $B_{12}$ active substances in the total solids. If less potent concentrates are employed, however, the increased relative amount of contaminants tends to somewhat impair the efficiency of the anion exchanger both in the step of adsorbing vitamin $B_{12}$ as a cyanide complex with the exchanger and in the preliminary adsorption step in the absence of cyanide ion.

In addition to the relative amount of contaminants present, the nature of the contaminants must be considered. Colored and/or tar forming contaminants in particular can impair the efficiency of the anion exchanger even in the case of more potent concentrates. It is therefore advantageous when concentrates are known to contain substantial amounts of colored and/or tar forming contaminants to subject such concentrates to a preliminary treatment to remove such contaminants. One procedure which is particularly effective for this purpose involves contacting a solution containing vitamin $B_{12}$ active substances with zinc hydroxide and separating the zinc hydroxide together with a substantial amount of the colored and/or tar forming contaminants from the residual solution of vitamin $B_{12}$ active substances. This zinc hydroxide purification is more fully disclosed and claimed in the copending application of Holland, Serial No. 230,424, filed June 7, 1951, since issued as U. S. Pat. #2,653,900, dated September 29, 1953.

The concentrates of vitamin $B_{12}$ active substances are preferably employed in our process as aqueous solutions, i. e., solutions in water and aqueous-organic solvent solutions. Anhydrous alcohol solutions can also be employed, although the results, particularly in the primary adsorption step in the presence of cyanide, are somewhat less effective, i. e., a greater amount of the vitamin $B_{12}$ escapes adsorption and must be recovered from effluent and wash solutions. The relative proportion of total solids to total volume of solution is not particularly critical, except that it is desirable in the primary adsorption step in the presence of cyanide to avoid undue excesses in the volume of solution to be handled. We have found, for example, that good results are obtained when the solutions treated with anion exchange resins in accordance with our procedures contain initially about 1 to 5% total solids. Solutions of this concentration may be obtained as such from preliminary vitamin $B_{12}$ recovery procedures, or alternatively, solid concentrates of suitable vitamin $B_{12}$ activity can be either dissolved in water or extracted with water or other aqueous solvent to form the actual starting solutions employed in our process.

In both the adsorption of vitamin $B_{12}$ active substances in the presence of cyanide ion, and the adsorption of contaminants in the absence of cyanide ion, the same general type of anion exchanger is employed. The anion exchangers which we find most effective in these procedures are the organic nitrogenous anion exchangers which derive their exchange capacity essentially from quaternary ammonium groups and which are generally referred to as strongly basic anion exchange resins. These resins may, of course, contain other active exchange groups such as primary, secondary, and tertiary amine groups, guanidine groups and like. In addition to the basicity of the resin, it is important that the resin be of a relatively porous structure, and in selecting a resin for use in the process both basicity and porosity should be considered. Maximum adsorption and purification of vitamin $B_{12}$ is obtained with strongly basic and highly porous exchange resins, while satisfactory but somewhat less efficient results are obtained with strongly basic resins of lower porosity and with less strongly basic resins having high porosity. Thus resins which are considered practical for use in our new procedures are the moderately to strongly basic and moderately to highly porous anion exchange resins.

A number of anion exchange resins which can be effectively employed in our process are commercially available. These include, for example, the strongly basic and highly porous anion exchange resins "Amberlite XE–75" and "Amberlite XE–98" (products of Rohm & Haas Company), the strongly basic and moderately porous anion exchange resin "Amberlite IRA–400" (product of Rohm & Haas Company) and the moderately basic and highly porous anion exchange resin "Ionac A–293" (a product of the Permutit Company). With "Amberlite XE–75" and "Amberlite XE–98", vitamin $B_{12}$ adsorption and recovery of 90% and higher has been achieved, whereas with "Amberlite IRA–400" and "Ionac A–293", adsorption and recovery of vitamin $B_{12}$ approaching 80% has been obtained. Other resins which have been effectively employed in our process, although somewhat less efficiently, include "Amberlite IR–4B" and "Amberlite XE–58" (products of Rohm & Haas Company), and "Permutit S" (a product of the Permutit Company).

We can employ the same resin or different resins in the primary adsorption step, and in the preliminary adsorption and purification step of our overall process. There appears, however, to be a distinct advantage in using the same resin in both adsorption steps. This advantage may be due to the fact that contaminants which are removed in the preliminary adsorption step are adsorbed to different degrees by different resins. Since a function of the preliminary adsorption step is to remove contaminants which might interfere with the adsorption of vitamin $B_{12}$ in the primary adsorption step, it follows that the contaminants most likely to interfere are best removed by using the same resin in the preliminary adsorption step.

Before use in either adsorption step, the selected resin is converted to the salt form by washing with a solution furnishing the desired anion. While anions of a number of inorganic and organic acids including sulfuric, hydrochloric, phosphoric, acetic, citric, and glutamic acids can effectively be employed in pretreatment of the resin, best results have been obtained by pretreatment with acetic or hydrochloric acid, thus converting the resin to the acetate or chloride form. It should be noted in this connection that there appears to be a distinct advantage in utilizing in the preliminary and primary adsorption steps, a resin which is in the form of a salt corresponding to the acid to be used in elution. Thus, for example, when it is desired to elute following the primary adsorption step with acetic acid, the resin as employed in the two adsorption steps should preferably be initially in the acetate form.

It is also possible to employ the resin in hydroxide form and to utilize a base such as sodium hydroxide for elution of vitamin $B_{12}$ following the primary adsorption step. This procedure, however, is less effective both in adsorption of vitamin $B_{12}$ and elution thereof than the procedure above described involving use of the resin in salt form and elution with an acid.

As previously pointed out, the primary adsorption step is carried out by contacting the resin with a solution containing vitamin $B_{12}$ active substances in the presence of cyanide ion. The cyanide ion can be introduced either by pretreating the resin to convert it wholly or partially to the cyanide form or adding an ionizable cyanide to the solution of vitamin $B_{12}$ active substances or, if desired, by employing a combination of these expedients. When treating high potency concentrates of vitamin $B_{12}$ active substances, satisfactory results can be obtained by employing resin which is wholly converted to the cyanide form without introducing additional cyanide in the solution. With less potent concentrates, however, i. e., with concentrates containing larger amounts of contaminants, it is generally advisable to introduce additional cyanide ion in the solution.

When cyanide ion is introduced in the solution of vitamin $B_{12}$ active substances and the resin is fully or partially in a salt form other than the cyanide form, the cyanide first introduced acts both to convert the resin to the cyanide form and to convert analogs of vitamin $B_{12}$ to vitamin $B_{12}$, thus permitting substantial adsorption of the active substances as a resin-CN-vitamin $B_{12}$ complex. Some formation of resin-CN-vitamin $B_{12}$ analog complex may also occur. If the resin is in the form of a salt other than cyanide and cyanide ion is introduced wholly in the solution of vitamin $B_{12}$ active substances, there may be some breakthrough of the active substances before the cyanide ion has reacted sufficiently with the resin to develop its adsorptive capacity. We have found, however, that when the resin is pretreated with cyanide to convert it at least 30% to the cyanide form, there is good adsorption, and very little breakthrough of vitamin $B_{12}$ active substances.

We have further found that when the desired amount of a solution of vitamin $B_{12}$ active substances has been fed to the resin it is advantageous to stop the feed of solution and allow the resin and the solution in contact therewith to stand for a period of about 2–3 hours during which there is a further adsorption of vitamin $B_{12}$ active substances on the resin. The resin is then washed with water prior to elution with acid, and it is found that with the holding period, the amount of the active substances removed in the effluent is very small, i. e., only about 2–10% as compared with about 5–20% without the holding period. Effluent which contains active substances is collected for reprocessing.

In the preliminary adsorption step, a solution containing vitamin $B_{12}$ active substances and contaminants is contacted with the acid treated resin, preferably by passing the solution through a column of the resin, the amount of solution added depending upon the experimentally determined adsorption capacity of the resin for contaminants present in the solution. Effluent solution is discarded until first appearance of color therein indicating the presence of vitamin $B_{12}$ active substances. Thereafter the effluent is collected while containuing to feed solution and/or wash water until the effluent solution changes from red to light pink or yellow in color. The total volume of effluent collected in this rich cut may be 4 to 5 times the volume of initial feed solution, but it contains 95% or more of the vitamin $B_{12}$ active substances. The washing is continued until the effluent solution again becomes substantially colorless, and this separately collected eluate is returned to an earlier process stage for reworking.

Regeneration of the column can readily be effected by washing first with acid as previously described and then with water to remove excess acid. In this connection, it is to be noted that initial portions of the acid regenerating wash may also contain traces of vitamin $B_{12}$ active substances, in which event these fractions may be saved for reprocessing.

The rich effluent obtained as above-described can be used as such as feed solution in the primary adsorption step or alternatively, the active substances can be separated therefrom as partially purified solid concentrate, and this concentrate, in turn, can be employed in making the feed solution for the primary adsorption step.

The resin is prepared for adsorption of vitamin $B_{12}$ by passing a solution preferably containing about 3 to 6 grams of potassium or sodium cyanide per 100 grams of resin through the acid washed resin to convert the resin partly to the cyanide form. To the rich effluent from the preliminary adsorption step, or to a solution prepared with a concentrate derived from such rich effluent, is added a quantity of soluble cyanide such as sodium or potassium cyanide ranging from about 0.1 to 3.0 grams per gram of vitamin $B_{12}$ active substances present in the feed solution, i. e., 2 to 60 moles of cyanide per mole of vitamin $B_{12}$ active substances (based on an assumed average molecular weight of 1400). After addition of cyanide, the feed solution is allowed to stand for ten to 15 minutes and is then passed through the resin followed by water. The amount of feed solution which can be added to the resin without breakthrough of active substances varies to some extent depending upon the relative potency or purity of the feed solution and upon the adsorptive capacity of the resin. In general, however, with the preferred strongly basic and highly porous resins, it is possible to add an amount of feed solution equivalent to about 1 gram of vitamin $B_{12}$ active substances per 100 grams of resin (dry basis) employed before there is any appreciable breakthrough of active substances.

During the passage of the feed solution and water through the resin, the effluent solution containing the bulk of the contaminants including some colored impurities can be discarded unless the appearance of a reddish-orange or purple color in the effluent indicates that a small amount of vitamin $B_{12}$ has escaped adsorption, in which event such colored portions of effluent should be collected for reworking. After the desired amount of feed solution has been introduced into the resin, the resin and solution in contact therewith is preferably allowed to stand for about 2–3 hours as above-described to permit the system to come to equilibrium. The resin is then washed with distilled water to remove the residual solution and contaminants in contact therewith, and this washing is continued until the effluent solution is substantially colorless and the total solid content of the effluent is less than 0.05 mg./cc. During the washing any portions containing a reddish-orange or purple color indicating the presence of vitamin $B_{12}$ active substances therein should, of course, be collected for reworking. At this point, the vitamin $B_{12}$ active substances freed of most of the contaminants associated therewith are bound to the resin apparently in the form of vitamin-CN-resin complexes.

Vitamin $B_{12}$ active substances can be separated from the resin adsorbate by contacting the resin adsorbate with an aqueous eluting solution of an acid, a base, or a salt. For recovery of vitamin $B_{12}$ from resin adsorbate, the eluant is preferably a solution of an acid as acid apparently breaks down the above-mentioned vitamin-cyanide-resin complexes. Salt solutions can also be employed in the elution but less efficiently than acid solutions. A large number of acids have been employed as eluting agents, including sulfuric, hydrochloric, phosphoric and acetic acids, all of which elute at least 90% and frequently almost 100% of the vitamin $B_{12}$. Other acids such as glutamic acid and citric acid, salts such as monobasic sodium or potassium phosphate, sodium and potassium chloride, and sodium and potassium sulfate and bases such as sodium hydroxide, although reasonably effective generally remove less than 90% of the adsorbed vitamin $B_{12}$. Elution with a base appears to remove the vitamin $B_{12}$ as a cyanide complex requiring acid treatment to release the free vitamin $B_{12}$.

The concentration of acid employed in the elution step depends, of course, upon the characteristics of the particular acid. With strong and highly ionized acids such as hydrochloric, sulfuric and phosphoric acids concentrations as great as about 1N can be used, although higher concentrations should be avoided in order to prevent possible damage to the vitamin $B_{12}$ during elution. With weakly ionized acids, it is, however, possible to use much higher concentrations, and by way of illustration it should be noted that acetic acid in all concentrations, including even glacial acetic acid, can be employed without damage to the vitamin $B_{12}$.

It is practical to employ as the eluting acid a solution of the same acid as was employed in pretreating the resin so that the elution step also performs the function of regenerating the resin for reuse in a succeeding adsorption cycle. In this connection, 5% aqueous solutions of acetic acid or hydrochloric acid are considered as preferred eluting agents.

In the elution step, hydrogen cyanide is liberated and adequate ventilation should be provided. Effluent solution is discarded until the first appearance of red-purple colored solution. The effluent is then collected as rich cut until it changes color to light orange or yellow, at which time separate collection of effluent is commenced and continued until the effluent is substantially colorless. The latter solution, which may contain 2-3% of the vitamin $B_{12}$ can be reworked by returning to an early process stage for recovery of the vitamin.

The rich effluent can be treated by known procedures to recover the vitamin $B_{12}$ therefrom. For example, by adding about ten volumes of acetone and allowing the mixture to stand, the bulk of the vitamin $B_{12}$ can be caused to crystallize from the mixture directly and the crystals thus obtained often have a purity of 90% or more. Alternatively, the rich effluent can be extracted two to three times with 1:1 chloroform:cresol, each time using a volume of the solvent mixture equivalent to about .1 the volume of the rich effluent. Upon addition of about two volumes of acetone and two volumes of ether to the resulting extract, vitamin $B_{12}$ having a purity of about 80-90% is precipitated. Products of higher purity can be obtained by recrystallization of the 80-90% product from water.

The ability to directly recover from the rich effluent a product having a purity of the order of 80-90% depends to some extent on the rate of elution and the manner of taking rich cuts of effluent solution. Effluent containing the highest vitamin $B_{12}$ potency can frequently be processed to directly recover a product which is 80-90% pure. On the other hand, however, if larger "rich cuts" of effluent are selected permitting a more nearly quantitative recovery of vitamin $B_{12}$, the purity of the product directly recovered from the effluent will be somewhat lower.

Another factor having bearing on the ability to directly recover high purity product from the effluent solution is the degree and nature of purification which has been effected prior to the primary adsorption step. In this connection, however, it should be noted that the procedure above-described involving adsorption of vitamin $B_{12}$ as a vitamin $B_{12}$-CN-resin complex is a distinctly advantageous procedure for commercial operation, even if the product directly recovered from the resulting effluent has a purity as low as 20-30%.

While the production of vitamin $B_{12}$ having a purity of about 80-90% even from effluents from the primary adsorption step having a potency as low as 20-30% can generally be carried out by removing hydrogen cyanide from such effluent, and repeatedly precipitating and/or crystallizing vitamin $B_{12}$ in accordance with known procedures to obtain products of successively increasing potency, the further purification of the 80-90% vitamin $B_{12}$ to a product having a purity as high as 99% is often much more difficult to carry out by crystallization alone. It has been found, however, that by subjecting a solution prepared from a product in which vitamin $B_{12}$ accounts for 40-50% or more of the total solids to supplemental treatment with an anion exchange resin in the absence of cyanide ion, the treated solution when subjected to conventional procedures for crystallization of vitamin $B_{12}$ readily yields products approaching or even exceeding 99% purity. This is apparently due to removal by the resin of impurities which interfere with the obtainment by crystallization of vitamin $B_{12}$ of such purity.

It should also be noted in this connection that the procedure above referred to as a supplemental treatment of vitamin $B_{12}$ solutions with anion exchange resin the absence of cyanide ion has general applicability apart from the vitamin $B_{12}$ adsorption herein described. Thus other vitamin $B_{12}$ solutions wherein the solids contain 40-50% or more of vitamin $B_{12}$ active substances whether obtained by procedures herein disclosed or by other procedures can be contacted with an anion exchange resin in the absence of cyanide ion to thereby effect purification by adsorption of contaminants associated with the vitamin $B_{12}$ active substances.

The following examples will show how procedures in accordance with our invention can be carried out, but it is to be understood that these examples are given by way of illustration and not of limitation.

EXAMPLE 1

Resin removal of impurities

A resin column is prepared as follows: 10 liters of Amberlite XE-75 resin is placed in a glass column 4 inches in inside diameter and 8 feet high. About 36 liters of aqueous 3% sodium hydroxide solution is passed downwardly through the resin at a rate of about 500 ml. per minute. Water is then passed downwardly through the resin to remove excess sodium hydroxide. About 25 liters of 25% aqueous acetic acid is then passed downwardly through the resin at a rate of about 300 ml. per minute, followed by a distilled water wash to remove acetic acid, and water sufficient to cover the resin is left in the column. At this point, the column is in the acetate form.

500 grams of a solid concentrate obtained by concentrating and purifying a fermentation broth produced by fermenting a suitable nutrient medium with *S. griseus*, and containing about 150 grams of diatomaceous earth filter aid and a maximum amount of vitamin $B_{12}$ active substances of about 20 grams, determined by measuring the intensity of light adsorption of a sample in aqueous solution, at a light wave length of 5500 Å, is extracted with water until a colorless extract is obtained, and the extracts are filtered. About 4 liters of water is required. The combined extracts are passed downwardly through the 10 liters of resin at a rate of about 100 ml. per minute, and the extracts are followed with water at the same rate. Effluent is discarded until the first appearance of colored solution. Effluent is then collected as rich cut until that obtained changes in color from red to light pink or yellow, at which time separate collection of effluent is commenced and continued until the effluent obtained is substantially colorless. The latter separately-collected effluent, about 20 liters in volume, contains a small fraction of the vitamin $B_{12}$ active substances present, and it is returned to an earlier process stage for reworking.

From the first effluent collected (rich cut), about 20 liters in volume and containing about 90–95% of the vitamin $B_{12}$ active substances, the active material is removed by extracting two or three times with 1–1 cresol-carbon tetrachloride, each time with about 0.1 volume of solvent. The spent aqueous layer is substantially colorless. To the combined extracts are added, with agitation, about 100 grams of diatomaceous earth filter aid, about 2 volumes of acetone, and about 2 volumes of ethyl ether. The resulting mixture of precipitate and filter aid is filtered on a filter precoated with about 50 grams of filter aid. The solid is washed with about 4 liters of acetone followed by about 1 liter of ethyl ether, and is then air-dried at room temperature. The dried solid, about 400 grams is extracted with water until a colorless extract is obtained, and the extracts are filtered. About 2 liters of water is required.

Resin removal of vitamin $B_{12}$

A second resin column is prepared as described under "Resin removal of impurities." About 120 grams of potassium cyanide is dissolved in about 1 liter of water, and this solution is passed downwardly through 10 liters of resin at a rate of about 5–10 ml. per minute. At this point, the column is partly in the acetate and partly in the cyanide form (about 63% acetate and 37% cyanide).

To the combined water extracts of the precipitate obtained from the first resin column effluent, is added about 60 grams of potassium cyanide, and the solution is stirred for about 15 minutes. This solution is then fed to the top of the acetate-cyanide resin column, at a rate of about 5–10 ml. per minute, and the solution is followed with about 2 liters of distilled water at about the same rate. The column is then washed with distilled water at a rate of about 100 ml. per minute until the effluent obtained is substantially colorless and the total solids content of the effluent obtained is less than about 0.05 mg. per ml. Shortly after the first part of the foregoing cyanide-treated extracts appears in the effluent, a reddish orange or orange-purple effluent fraction appears which contains a small amount of vitamin $B_{12}$ active substances. This fraction is collected separately and returned to an earlier process stage for reworking. (When the same procedure is carried out but a standing period of 2–3 hours is provided between addition of the cyanide treated extracts to the column and washing the column with water, the initial breakthrough of small amounts of vitamin $B_{12}$ active substances above mentioned is substantially eliminated. The 2–3 hour holding period appears to permit a more nearly quantitative adsorption of vitamin $B_{12}$ active substances by the resin.)

Aqueous acetic acid, about 5% acetic acid, preferably cooled to about 5° C. (during elution, heat is evolved), is then passed downwardly through the water-washed resin at a rate of about 75 ml. per minute, to elute the vitamin $B_{12}$. Effluent is discarded until the first appearance of red-purple solution. The effluent is then collected as rich cut until it changes in color to light orange or yellow, at which time separate collection of effluent is commenced and continued until the effluent is substantially colorless. The latter separately-collected effluent, about 8 liters in volume, contains but a small fraction of the vitamin $B_{12}$ present, and it is returned to an earlier process stage for reworking.

From the rich effluent, about 8 liters in volume, the vitamin $B_{12}$ is removed by extracting about three times with 1–1 cresol-carbon tetrachloride, first with about 0.1 volume of solvent and thereafter with 0.05 volume of solvent each time until the spent aqueous layer is substantially colorless. To the combined extracts are added, with agitation, about 2 volumes of acetone and 2 volumes of ethyl ether. A precipitate forms, is removed by filtration on a filter precoated with filter aid, washed with acetone and dried in vacuo at room temperature.

Recovery of pure vitamin $B_{12}$

The dried solid is extracted with water until colorless extract is obtained, and the extracts are filtered and diluted to a concentration of about 5–10 mg. of vitamin $B_{12}$ per ml., determined by measurement of light absorption at 5500Å. Crystallization of vitamin $B_{12}$ is effected by adding acetone, about 7–10 volumes, slowly and with mild agitation. An optimum yield of crystalline vitamin $B_{12}$ is obtained by allowing the mixture to stand about 16–24 hours, after which the crystals are removed by filtration, washed with acetone, and dried. The crystals thus obtained are about 85–90% pure vitamin $B_{12}$. This product is further purified by simply recrystallizing from water to yield vitamin $B_{12}$ of purity in excess of 95%.

Repetition of the foregoing procedure with different starting concentrates has sometimes yielded as an initial product vitamin $B_{12}$ having a purity somewhat below 85%. Such products of lower purity are advantageously purified by passing an aqueous solution of the product through a bed of resin as described under "Resin removal of impurities." After such supplemental resin treatment, addition of acetone to the rich effluent often causes direct precipitation of vitamin $B_{12}$ having a purity of 99% or more.

EXAMPLE 2

Resin removal of impurities

A resin column is prepared as follows: 230 ml. of Amberlite XE–75 resin is placed in a glass column, 1 inch inside diameter and 24 inches high. About 700 ml. of aqueous 3% sodium hydroxide solution is passed downwardly through the resin at a rate of about 5 ml. per minute, followed by aqueous sodium chloride solution, at the same rate, until the effluent is neutral. The resin is then washed with distilled water at the same rate until the effluent is free of chloride ion, and water sufficient to cover the resin is left in the column. At this point, the column is in the chloride form.

41 grams of a vitamin $B_{12}$ concentrate, containing a maximum of about 3½% of vitamin $B_{12}$ active substances is dissolved in about 115 ml. of water, and undissolved solids are removed by filtration. The filtrate is passed downwardly through the resin at a rate of about 4 ml. per minute, and it is followed with water at the same rate. Effluent is discarded until the first appearance of colored solution. Effluent is then collected as rich cut so long as colored effluent is obtained. About 475 ml. of rich effluent is obtained.

Resin removal of vitamin $B_{12}$

The resin used to remove impurities is regenerated in the same manner as described in the foregoing section. About 3 grams of sodium cyanide is dissolved in 30 ml. of water, and this solution is passed downwardly through the resin at a rate of about 4 ml. per minute. At this point, the column is partly in the chloride and partly in the cyanide form.

To the rich effluent from the first resin treatment is added about 3 mg. of sodium cyanide, and the solution is stirred for about 10 minutes. This solution is then fed to the top of the resin column at a rate of about 4 ml. per minute, and the solution is followed with about 450 ml. of distilled water at the same rate. The column is then washed with distilled water at a rate of about 12–15 ml. per minute until the effluent obtained is substantially colorless and the total solids content of the effluent obtained is below about 0.05 mg. per ml.

Aqueous 5% acetic acid solution is then passed downwardly through the resin at a rate of about 1 ml. per minute. Effluent is discarded until the first appearance of red-purple solution. Effluent is then collected in 50 ml. portions as rich cut, until the effluent obtained is substantially colorless. About five such portions are collected. The first two fractions contain the bulk of the vitamin $B_{12}$, and are diluted with 10 volumes of acetone and allowed to stand, whereupon crystallization occurs. The crystals (about 1.383 grams before drying) obtained are about 90% pure vitamin $B_{12}$ (on an anhydrous basis). The remaining fractions of lesser purity are reprocessed.

The distribution of vitamin $B_{12}$ active substances in the various stages of the process are tabulated below, the values for grams of total color being a measure of the concentration of vitamin $B_{12}$ active substances based upon calculations from measurements of optical density of solutions at 5500Å, and compared with the value for pure vitamin $B_{12}$, i. e.

$$E^{1\%}_{1\,cm.} = 64$$

| Component | Grams of Total Color |
| --- | --- |
| Column I: | |
| Feed | 1.350. |
| Rich Breakthrough (Feed for Column II) | 1.310. |
| Tail Cut | 0.023. |
| 5% Acetic Acid Column Wash | 0.062. |
| Column II: | |
| Feed | 1.310. |
| Breakthrough | .126. |
| Rich Eluate 1 | .630 (0.750 gm. crystals). |
| Rich Eluate 2 | .425 (0.633 gm. crystals). |
| Rich Eluate 3 | .136. |
| Rich Eluate 4 | .029. |
| Rich Eluate 5 | .008. |

In the foregoing tabulation, it should be noted that the values given for grams of total color are based on optical density measurements which by their very nature are approximations. With respect to the data concerning column II, the fact that the total color in the eluate fractions exceeds the total color in the feed is due to the presence of vitamin $B_{12}$ analogs such as vitamin $B_{12a}$ in the feed. The optical density measurements are made at 5500Å at which vitamin $B_{12}$ exhibits a maximum absorption. At this wave length, however, the absorptions by vitamin $B_{12}$ analogs are not so great, and hence calculations using the value $$E^{1\%}_{1\,cm.} = 64$$

which is characteristic of vitamin $B_{12}$ give an approximation of vitamin $B_{12}$ active substances which is somewhat lower than the actual amount of vitamin $B_{12}$ active substances present in the feed. With this explanation, it will be evident that the data concerning column II indicates that a substantial conversion of vitamin $B_{12}$ analogs such as vitamin $B_{12a}$ to vitamin $B_{12}$ has been effected in the primary adsorption step (column II).

EXAMPLE 3

Aqueous vitamin $B_{12}$ solution containing about 10 mg. of vitamin $B_{12}$ and vitamin $B_{12}$-like compounds, and 90 mg. of unidentified impurities per ml. is treated with 60 mg. of potassium cyanide per ml. and 5 ml. portions of the resulting solution, each containing 51.5 mg. of vitamin $B_{12}$ color (as measured at 5500Å), are passed through Amberlite XE–98 resin columns which contain 25 ml. of resin and are in the hydroxide, acetate, and cyanide-acetate form respectively. The columns are washed with water and eluted with aqueous 5% acetic acid solution. The procedure corresponds to that described under "Resin removal of vitamin $B_{12}$" in Example 2. It is found that adsorption of vitamin $B_{12}$ takes place, that elution is readily effected, and that considerable purification is obtained in each instance. Comparative data indicate that both adsorption per unit of resin and purification vary according to the resin form as follows:

| Resin Form | Mg of Vitamin $B_{12}$ (color | | Percent Adsorption [1] |
| --- | --- | --- | --- |
| | In Eluate | In Eluate+ Breakthrough | |
| Cyanide Acetate | 41 | 55 | 80–90. |
| Acetate | 37 | 54 | 60–80. |
| Hydroxide | 24 | 48 | Less than 50. |

[1] Assuming 100% elution of vitamin $B_{12}$ adsorbed.

EXAMPLE 4

Through an Amberlite XE–98 resin column, containing 25 ml. of resin which is in the cyanide form, is passed approximately 5 ml. of an aqueous solution containing about 10 mg. of vitamin $B_{12}$ active substances, and 90 mg. of unidentified impurities per ml. The column is washed with water and eluted with aqueous 5% acetic acid solution. The procedure corresponds to that described under "Resin removal of vitamin $B_{12}$" in Example 2. It is found that adsorption of vitamin $B_{12}$ takes place, that elution is readily effected, and that considerable purification is obtained. In elution the eluate (rich cut) contained 39 mg. of vitamin $B_{12}$ as compared with a total of 51 gm. in the eluate plus breakthrough indicating that the adsorption (assuming 100% elution) is about 70–80%.

EXAMPLE 5

Through an Amberlite XE–98 resin column which is in the cyanide-acetate form and is filled with methanol, is passed a potassium cyanide-treated methanolic solution of a vitamin $B_{12}$ concentrate. The column is washed successively with methanol, water, and methanol. The column is then eluted with methanolic 10% acetic acid solution. The procedure otherwise corresponds to that described under "Resin removal of vitamin $B_{12}$" in Example 2. It is found that adsorption of vitamin $B_{12}$ takes place, that elution is readily effected, and that purification is obtained. The adsorption in this instance based upon a ratio of vitamin $B_{12}$ in the eluate (rich cut)/vitamin $B_{12}$ in eluate plus breakthrough, i. e., 23 mg./37 mg., is about 60–80%.

Through an Amberlite GE–98 resin column, which is in the cyanide-acetate form and is filled with water, is passed a potassium cyanide-treated aqueous solution of a vitamin $B_{12}$ concentrate. The column is washed successively with water and methanol. The column is then eluted with methanolic 5% acetic acid solution. The procedure otherwise corresponds to that described under "Resin removal of vitamin $B_{12}$" in Example 2. It is found that adsorption of vitamin $B_{12}$ takes place, that elution is readily effected, and that purification is obtained. Adsorption in this instance is in excess of 90%, i. e., 47.7 mg. of vitamin $B_{12}$ in the eluate (rich cut) per 49.7 mg. of vitamin $B_{12}$ in the eluate and breakthrough, indicating that the feed of a water solution is superior to the methanolic feed.

EXAMPLE 6

A potassium cyanide-treated aqueous solution of a vitamin $B_{12}$ concentrate is divided into three equal parts; the parts are adjusted to pH 4, 7, and 9, respectively, and each of the parts are processed in the manner described under "Resin removal of vitamin $B_{12}$" in Example 2. It is found that substantially the same adsorption, elution and purification results are obtained at the several pH values.

EXAMPLE 7

The procedure described in Example 2 is repeated, except that Amberlite IRA–400 anion exchange resin is employed. It is found that impurities are removed by treatment with the resin in the absence of cyanide and that in the presence of cyanide, adsorption of vtiamin $B_{12}$ takes place, subsequent elution is readily effected, and purification is obtained. The adsorption in this instance is about 60–80%, i. e., slightly less than that obtained with Amberlite XE–75 or XE–98.

EXAMPLE 8

The procedure described in Example 2 in three separate runs is repeated wherein Amberlite XE–58, Amberlite IR 4 b, and Permutit S are employed in place of Amberlite XE–75. It is found that impurities are removed by treatment with the resin in the absence of cyanide and that in the presence of cyanide, adsorption of vitamin $B_{12}$ takes place, subsequent elution is readily effected, and purification is obtained. The adsorption with these resins, however, is found to be relatively low, i. e., less than 50% of the active substances are adsorbed and recovered as eluate (rich cut).

EXAMPLE 9

The procedure described in Example 2 is repeated, except that Ionac A–293 anion exchange resin is employed. It is found that impurities are removed by treatment with the resin in the absence of cyanide and that in the presence of cyanide, adsorption of vitamin $B_{12}$ takes place, subsequent elution is readily effected, and purification is obtained. Adsorption with this resin is found to be relatively high, i. e., about 70–90% of the active substances are adsorbed and recovered as eluate (rich cut).

EXAMPLE 10

The procedure described under "Resin removal of vitamin $B_{12}$" in Example 2 is repeated, except that aliquot parts of the resin adsorbate are eluted separately with an aqueous solution of one of sulfuric acid, hydrochloric acid, phosphoric acid, glutamic acid, citric acid, monobasic potassium phosphate, and sodium hydroxide. Good elution (90% or more) is obtained with the first three solutions, fair elution (60–90%) is obtained with the next three solutions, and rather poor elution (less than 50%) is obtained with sodium hydroxide solution.

The above procedure is repeated, eluting and washing the resin adsorbate alternately with aqueous sodium chloride solution, water, sodium chloride solution, water, monobasic sodium phosphate, water, sodium sulfate, and water, in each instance until the effluent becomes substantially colorless. Vitamin $B_{12}$ is present in each fraction, in varying proportions, and substantially all of the vitamin $B_{12}$ is eluted.

EXAMPLE 11

Several aqueous concentrates containing vitamin $B_{12}$ active substances and obtained by the same procedure are purified by passage through columns containing 45 liters of Amberlite XE–98 resin, in the acetate form. The concentrates are 40–60 gals. in volume. Passage through the columns and collection of fractions follows generally the procedures described under "Resin removal of impurities" in Examples 1 and 2. In each case, color measurements show that a substantial removal of colored impurities takes place. Further results are shown in the following table:

| Run No. | $B_{12}$ Active Substances, Gms.[1] | | Total Solids, Gms. | |
|---|---|---|---|---|
| | Column Feed | Rich Effluent | Column Feed | Rich Effluent |
| 1 | 87.3 | 76.7 | 8,140 | 5,200 |
| 2 | 64 | 64 | 5,100 | 4,270 |
| 3 | 77.6 | 72 | 6,730 | 5,200 |
| 4 | 64.3 | 59.5 | 4,470 | 3,120 |
| 5 | 38.2 | 35.9 | 6,500 | 5,550 |
| 6 | 48.4 | 48.8 | 8,050 | 5,950 |

[1] Assayed employing radioactive vitamin $B_{12}$ as a tracer.

Various changes and modifications may be made in carrying out the present invention without departing from the spirit and scope thereof, and insofar as these changes are within the purview of the annexed claims, they are to be considered as part of our invention.

We claim:

1. The process that comprises contacting an aqueous solution of vitamin $B_{12}$ active substances and contaminants with an anion exchange resin which is in salt form and which derives its exchange capacity essentially from quaternary ammonium groups, while providing a source of cyanide ions, thereby separating vitamin $B_{12}$ active substances as a vitamin $B_{12}$-cyanide-resin adsorbate from contaminants which remain in the solution, and eluting vitamin $B_{12}$ from the resin adsorbate with an acidic aqueous solution.

2. The process of claim 1 wherein the source of cyanide ions is provided at least in part by adding an ionizable cyanide to the starting solution.

3. The process of claim 1 wherein the source of cyanide ions is provided at least in part by pretreating the resin with an ionizable cyanide to convert the resin at least partially to the cyanide form.

4. The process that comprises treating an aqueous solution of vitamin $B_{12}$ active substances and contaminants with an anion exchange resin in salt form in the presence of cyanide ion, thereby effecting a separation of vitamin $B_{12}$ active substances in the adsorbate from contaminants which remain in the residual solution, retaining the solution in contact with the resin adsorbate for a 2–3 hour period, then washing said residual solution from the adsorbate, and eluting vitamin $B_{12}$ from the resin adsorbate with an acidic aqueous solution.

5. The process for separating vitamin $B_{12}$ active substances from contaminants associated therewith that comprises contacting an aqueous solution containing vitamin $B_{12}$ active substances and contaminants with an anion exchange resin in the presence of cyanide ion and removing the residual solution, thereby effecting separation of a resin adsorbate containing said vitamin $B_{12}$ active substances in the form of a vitamin $B_{12}$-cyanide-resin complex from contaminants in said residual solution, and contacting said resin adsorbate with an aqueous eluting agent to separate the vitamin $B_{12}$ active substances therefrom.

6. The process of claim 5 wherein the anion exchange resin is employed in a salt form convertible to the cyanide form in the presence of cyanide ion.

7. The process of claim 5 wherein the anion exchange resin employed is a strongly basic and highly porous anion exchange resin.

8. The process of claim 5 wherein the anion exchange resin employed is one which derives its exchange capacity essentially from quaternary ammonium groups.

9. The process of claim 5 wherein the cyanide ion is furnished at least in part by pretreatment of the resin to convert the resin at least partially to the cyanide form.

10. The process of claim 5 wherein the resin adsorbate is washed with an aqueous acidic eluting agent, thereby recovering the vitamin $B_{12}$ active substances as vitamin $B_{12}$.

11. The process of claim 10 wherein the anion exchange resin employed is in salt form having a characteristic anion convertible to cyanide in the presence of cyanide ion and the acidic eluting agent has the same anion as the characteristic anion of said resin.

References Cited in the file of this patent

UNITED STATES PATENTS

| | | |
|---|---|---|
| 2,407,096 | Pfiffner | Sept. 3, 1946 |
| 2,530,416 | Wolf | Nov. 21, 1950 |
| 2,563,794 | Rickes | Aug. 7, 1951 |
| 2,582,589 | Fricke | Jan. 15, 1952 |

OTHER REFERENCES

Kunin, Ion Exchange Resins (1950), pp. 134, 187.

Emery, Biochemical Jour., vol. 46, May 1950, pp. 572 to 574.